Figure 1:
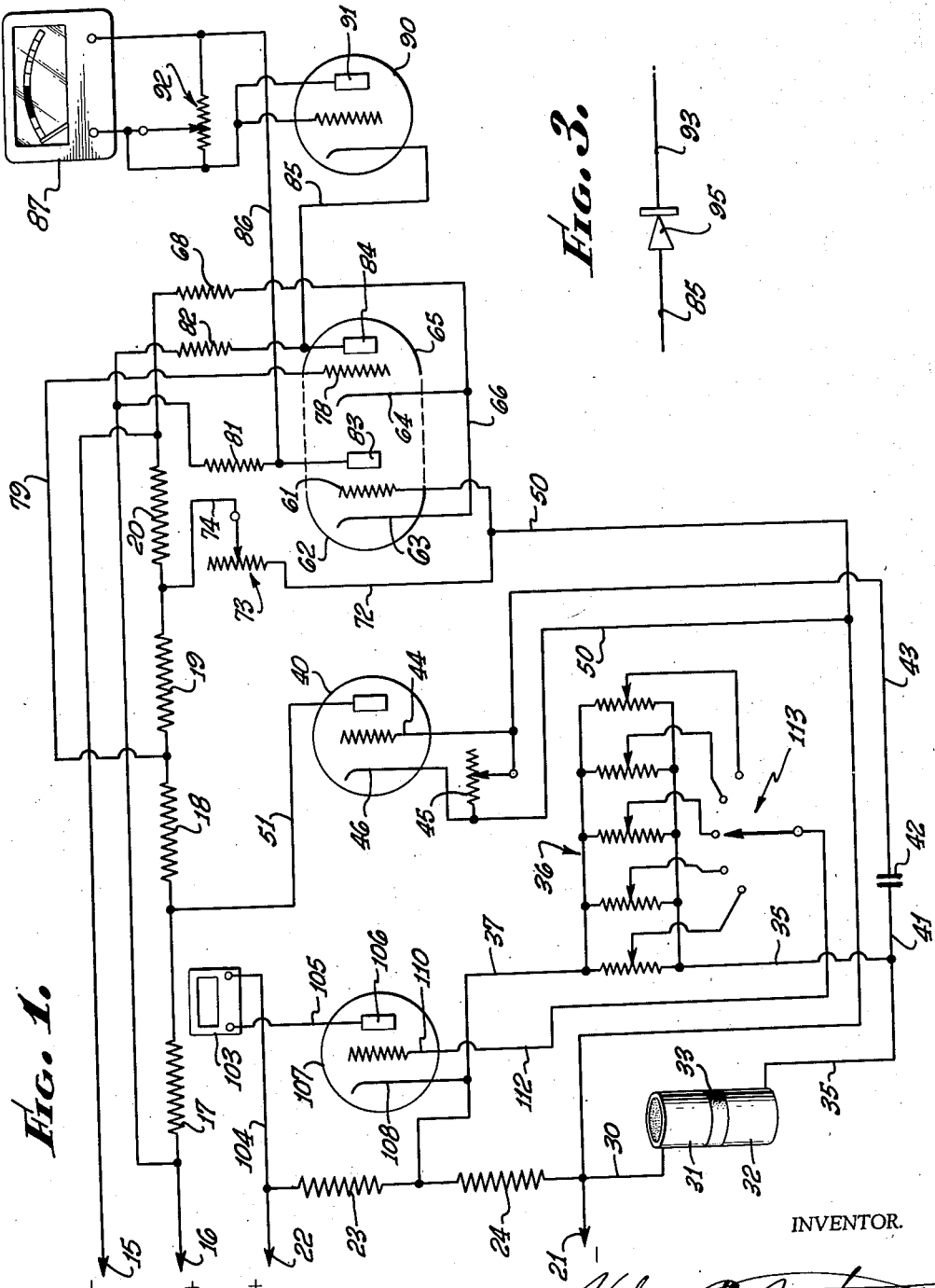

July 16, 1957 V. G. MATHISON 2,799,269
ELECTROPSYCHOMETER OR BIOELECTRONIC INSTRUMENT
Filed Feb. 7, 1956 2 Sheets-Sheet 1

INVENTOR.

July 16, 1957 V. G. MATHISON 2,799,269
ELECTROPSYCHOMETER OR BIOELECTRONIC INSTRUMENT
Filed Feb. 7, 1956 2 Sheets-Sheet 2
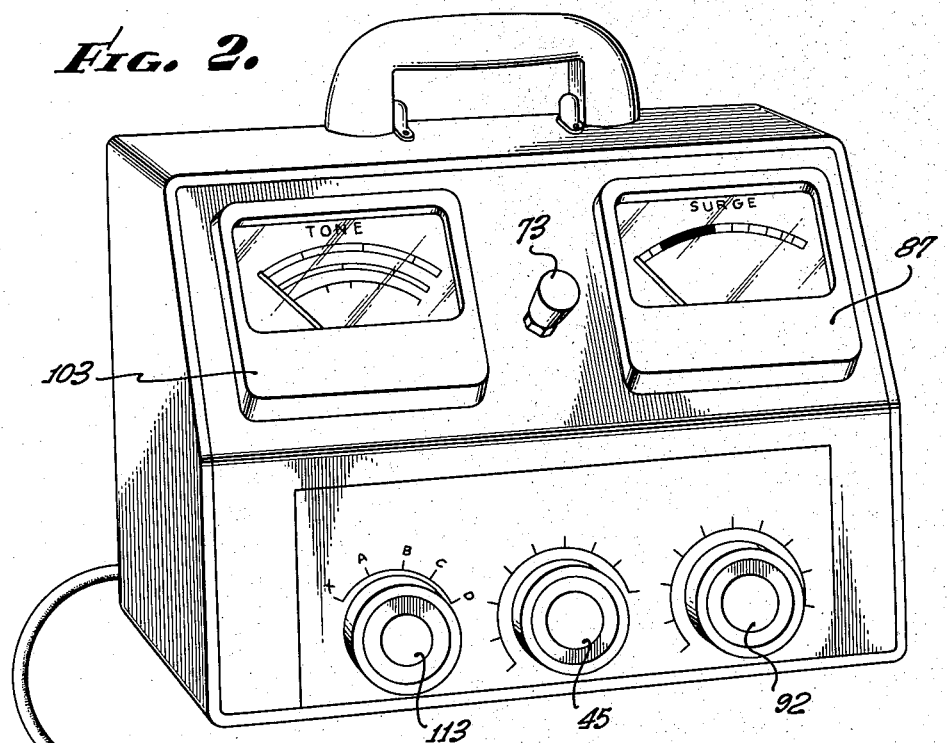
FIG. 2.
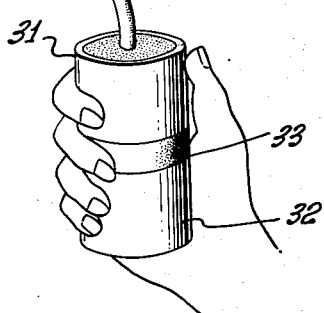
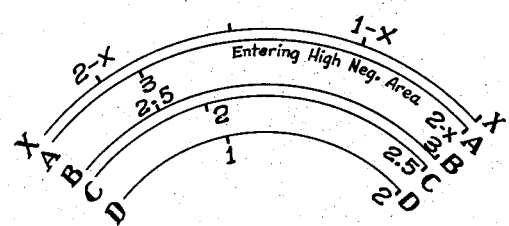
FIG. 4.
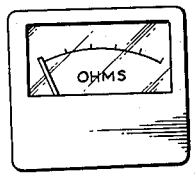
FIG. 5.
INVENTOR.

United States Patent Office 2,799,269
Patented July 16, 1957

2,799,269
ELECTROPSYCHOMETER OR BIOELECTRONIC INSTRUMENT

Volney G. Mathison, Los Angeles, Calif.

Application February 7, 1956, Serial No. 563,877

4 Claims. (Cl. 128—2.1)

The invention disclosed herein is an improved model of my previous electropsychometers. The present instrument has two simultaneously operating electromagnetic indicating meters, one of which is designated as the surge meter, since it registers emotional surges being experienced by a person connected to the instrument. The second indicating meter is designated as the electropsychometric tone meter, or simply as the tone meter. This second meter registers continuously the electrical ohmic resistance existing between the skin-contacing elements of the special electrode structure which the examinee holds in one hand or the other.

Several years of research discloses that the continuous electrical ohmic resistance between the skin-contacting elements of the hand-held electrode structure shown herein consistently falls within a broad but definitely limited range of values, in the cases of average normal examinees. Sharply lowered ohmic readings, employing the same electrical circuit, operating voltages, and skin-contacting electrode elements, consistently indicates that the person being examined is suffering from either severe emotional tension or from some form of acute physical illness. On the other hand, an examinee who registers an abnormally high value of ohmic resistance on the same circuit and skin-contacting electrode arrangement, is consistently found to be in a markedly desensitized nervous condition, as occurs, for instance, through the use of tranquilizing drugs, or as a consequence of physically deteriorated nerve structures, as is encountered in advanced cases of multiple sclerosis.

Since the calibration in ohms of the continuously indicating electropsychometric tone meter may be confusing to the practitioner, the tone meter is calibrated instead with symbols and arbitrary numerals which indicate directly the three general psychophysical conditions mentioned above; that is, firstly, the average-normal values; secondly, the acutely low values, and thirdly the abnormally high, or "high negative" values of ohmic resistance that may be encountered in an examinee connected to the instrument.

The invention disclosed herein therefore presents in a single instrument much more relevant diagnostic data than has been available with my previous electropsychometers.

The invention is fully disclosed, by way of example, in the following drawings. Fig. 1 shows the complete electrical circuit of the instrument. Fig. 2 is a view of the actual instrument, as reduced to practice, with electropsychometric tone meter, transient surge meter, operating controls, and a special type of hand-held electrode structure. Fig. 3 shows a modification, wherein an alternative type of rectifying element is connected in series with the winding of the surge meter. Fig. 4 discloses the system of scales mounted on the electropsychometric tone meter, the area between approximately the numerals 2 and 2.5 denoting average normal registrations; the area below 2 denoting increasingly acute tension or illness; and the areas on the two outer scales carrying the numerals 2X and 1X denoting high negative or desensitized nervous conditions. When the instrument is in use, the correct scale to be observed on the tone meter is indicated by the position of a selector switch 113 (Figs. 1 and 2). Fig. 5 discloses an alternative arrangement wherein the tone meter is calibrated in ohms or in multiples thereof.

Reference to the drawings will now be made by use of like characters that are used to designate corresponding parts or conductors throughout.

The numerals 15, 16 denote the negative and positive terminals of a source of vacuum tube plate power, which may be of any conventional type. 17, 18, 19, 20 denote four resistors which are connected in series across the negative and positive terminals 15, 16, forming a voltage-divider system across the said plate supply source.

21, 22 denote the negative and positive terminals of a second vacuum tube plate power supply source, which preferably is electrically independent of the source indicated above by the numerals 15, 16. 23, 24 denote two resistors connected in series across terminals 21, 22, forming a voltage divider across the said terminals.

A conductor 30 is connected from negative power supply terminal 21 to a conductive skin-contacting element 31. Element 31 and a second similar element 32 are mounted upon a common relatively non-conductive member 33. A conductor 35 connects electrode 32 to one terminal of a system of parallel-connected potentiometers 36. A conductor 37 connects the other terminal of potentiometer system 36 to a point of positive potential on the power supply voltage divider system comprised of resistors 23, 24.

A conductor also connects electrode element 32 to one terminal of a condenser 42. The other terminal of condenser 42 is connected by conductor 43 to the grid terminal 44 of a triode type vacuum tube 40. Grid element 44 is also connected to one terminal of a resistor 45. The other terminal of resistor 45 is connected to cathode terminal 46 of vacuum tube 40. Cathode terminal 46 is also connected by a conductor to negative power supply terminal 21. A conductor 51 connected between voltage-divider resistors 17—18, delivers a positive potential to the plate terminal of vacuum tube 40.

The above-described parts and conductors provide a means for establishing an electrical potential across the elements 31, 32 of the skin-contacting electrode structure, and also provide a means for impressing transient variations of electrical potential upon the grid element of vacuum tube 40 which substantially are related to variations of ohmic resistance occurring across electrode elements 31, 32.

A conductor is connected from cathode terminal 46 of tube 40 to grid terminal 61 of a second triode vacuum tube 62. The cathode terminal 63 of tube 62 and the cathode terminal 64 of a third triode vacuum tube 65 are connected to one terminal of a resistor 68. The other terminal of resistor 68 is connected to negative power supply terminal 15. A conductor 72 connects the grid terminal 61 of vacuum tube 62 to one terminal of a variable resistance 73. The other terminal of resistance 73 is connected between voltage-divider resistors 19, 20.

A conductor is connected from positive power supply terminal 16 to one terminal of a resistor 81 and to one terminal of another resistor 82. The other terminal of resistor 81 is connected to the plate terminal 83 of vacuum tube 62. The second terminal of resistor 82 is connected to the plate terminal 84 of vacuum tube 65. A conductor 86 is connected from plate terminal 83 of tube 62 to the positive terminal of an electromagnetic type of indicating meter 87. Another conductor connects the negative terminal of meter 87 to plate terminal 84 of tube 65.

The numeral 103 denotes a second electromagnetic type of indicating meter upon which is mounted the special system of scales shown in Fig. 4. A conductor 104 connects the positive terminal of meter 103 to the positive terminal 22 of the second auxiliary plate power supply source. A conductor 105 connects the negative terminal of meter 103 to the plate terminal 106 of a triode type vacuum tube 107. The cathode terminal 108 of the vacuum tube 107 is connected to a point on the voltage dividing system comprised of the series-connected resistances 23, 24. The grid terminal 110 of tube 107 is connected by conductor 112 to the movable contact terminal of a selector switch 113. The contacted terminals of selector switch 113 are connected by conductors to the movable contact terminals of the parallel-connected system of potentiometers designated by the numeral 36.

The scale or system of scales mounted on meter 103 may be similar to those shown, by way of example, in Fig. 4. However, I do not wish the present invention limited to the use of this system of scales. Scales registering in other numerals or values, for example in ohms, or multiples thereof may be used, as shown in Fig. 5.

The two indicating meters 87 and 103, are operated simultaneously. Meter 103 is actuated by current flowing through the plate-cathode circuit of vacuum tube 107. The flow of current through meter 103 is limited by the value of negative biasing potential at the grid of tube 107. The biasing potential at the grid of tube 107 is governed by the value of the voltage drop existing across the potentiometer system 36, the said voltage drop in turn being related to the value of ohmic resistance existing between the conductors 30, 35 which connect to the input system of skin-contacting electrode elements.

With reference to the case of a patient to whom the instrument is applied, this invention effects the simultaneous registration of electropsychometric tone and of the onset of emotional surges from a single hand-held bioelectronic structure, or from a single system of skin-contacting electrode elements.

In order to conform with the illustrated positions of the several vacuum tubes shown in Fig. 1, as viewed from left to right, in all of the claims appended hereto, tube 107 is referred to as the first triode-type tube, tube 40 as the second triode-type tube, tube 62 as the third triode-type tube, tube 65 as the fourth triode type tube, and tube 90 as a fifth diode-type tube or diode-connected tube.

Potential across terminals 15 and 16 may be 250 volts. Potential across the elements of the skin-contacting electrode elements 31 and 32 may, under open circuit conditions be about 10 volts. Resistor 17, 56K; resistor 18, 10K; resistor 19, 3K, resistor 20, 27K. Resistor 23, 39K; resistor 24, 5600 ohms. Each potentiometer in the parallel-connected bank 36 may be 500K. Adjustable resistance 73, 30K; potentiometer 92, 5K; resistors 81, 82, each 39K; resistor 68, 27K. Vacuum tube 40 may be a 6SF5 or a 6SC7 with grids connected in parallel and plates connected in parallel. Tubes 62 and 65 may be the two sections of a 6SN7 tube with a common envelope, or may be two separate 6J5 tubes. Meters 87 and 103 may be of 50 microampere direct current type with windings of 1800 ohms. Capacitor 42 may be of ½ microfarad. Electrode elements 31, 32 may be two inches in diameter by two inches in length, separated ⅜ inch on a common insulating member.

Throughout this specification and in all of the claims appended hereto, each section of any twin type tube is invariably described and referred to as a separate tube.

The instrument functions in the following manner: Transient or abrupt variations of resistance occurring across the terminals of the skin-contacting electrodes are translated into amplified registrations on the surge meter 87, partly through the charging of condenser 42. This is followed by the discharge of condenser 42 through the grid leak resistor 45, causing the indicating needle of meter 87 to return automatically to its inactive or "zero" position. At the same time, meter 107 functions, in the main, as a vacuum-tube operated ohmmeter. There are no interacting effects between the two indicating meters or their associated circuits, although both meters are actuated by variations of ohmic resistance between the elements of a single hand-held electrode.

I claim:

1. An electropsychometer, a bioelectronic instrument that registers certain electropsychophysical conditions in the case of a person to whom it is applied, comprising five vacuum tubes or a lesser number of twin-type vacuum tubes described and considered as equivalent to five separate tubes and hereinafter designated as the first triode-type tube, the second triode-type tube, the third triode-type tube, the fourth triode-type tube, and a fifth diode or diode-connected tube, two electromagnetic indicating meters, and a skin-contacting electrode structure consisting of two or more electrically conductive elements mounted on a relatively non-conductive member, means for establishing an electrical potential between the said electrode elements, means for connecting the positively polarized element or elements of the said skin-contacting electrode structure to one terminal of a capacitor, the other terminal of the said capacitor being connected to the grid terminal of the above-mentioned second vacuum tube, the grid terminal of the said vacuum tube also being connected to one terminal of a resistance, the other terminal of the said resistance being connected to the cathode terminal of the aforesaid second vacuum tube, the said cathode terminal of the said second tube being also connected to the negatively polarized element or elements of the aforesaid skin-contacting electrode structure, a conductor from the cathode terminal of the said second vacuum tube to the grid terminal of a previously mentioned third vacuum tube, a conductor from the cathode terminal of the said third vacuum tube to the cathode terminal of a previously mentioned fourth vacuum tube, means for establishing an electrical potential between the plate and cathode elements of the said third and fourth vacuum tubes, the said electrical potential being derived from a common vacuum tube plate power supply source, means for connecting the plate terminal of the aforesaid second vacuum tube to the said vacuum tube plate power supply source, means for establishing biasing potentials at the grid terminals of the aforesaid third and fourth vacuum tubes, a previously mentioned electromagnetic type of indicating meter, the said meter being designated hereinafter as a surge meter, the winding of the said surge meter being connected in series with the anode and cathode elements of a previously mentioned fifth vacuum tube operating as a rectifier, the said surge meter and vacuum tube rectifier being connected between the terminals of the plate elements of the aforesaid third and fourth vacuum tubes, means for relating the ohmic value of resistance existing between the previously described positively and negatively polarized skin-contacting electrode elements to the value of negative biasing potential appearing at the terminals of the above-mentioned first vacuum tube, means for establishing an electrical potential between the plate and cathode elements of the said first vacuum tube, the said electrical potential being applied to the said tube through the winding of a previously-mentioned second electromagnetic type of indicating meter, the said meter having a scale or a system of scales upon which are placed characters that are presumed to indicate data relative to the psychophysical condition of the person holding the above-described skin-contacting electrode structure.

2. An electropsychometer, a bioelectric instrument that registers certain electropsychophysical conditions in the case of a person to whom it is applied, comprising five vacuum tubes or a lesser number of twin-type vacuum tubes described and considered as equivalent to five separate tubes and hereinafter designated as the first triode-type tube, the second triode-type tube, the third triode-type tube, the fourth triode-type tube, and a fifth diode or diode-connected tube, two electromagnetic indicating meters, and a system of skin-contacting electrode elements, means for establishing an electrical potential between the said electrode elements, means for connecting the positively polarized element or elements of the said skin-contacting electrode system to one terminal of a capacitor, the other terminal of the said capacitor being connected to the grid terminal of the above-mentioned second vacuum tube, the grid terminal of the said vacuum tube also being connected to one terminal of a resistance, the other terminal of the said resistance being connected to the cathode terminal of the aforesaid second vacuum tube, the said cathode terminal of the said second tube being also connected to the negatively polarized element or elements of the aforesaid skin-contacting electrode system, a conductor from the cathode terminal of the said second vacuum tube to the grid terminal of a previously mentioned third vacuum tube, a conductor from the cathode terminal of the said third vacuum tube to the cathode terminal of a previously mentioned fourth vacuum tube, means for establishing an electrical potential between the plate and cathode elements of the said third and fourth vacuum tubes, the said electrical potential being derived from a common vacuum tube plate power supply source, means for connecting the plate terminal of the aforesaid second vacuum tube to the said vacuum tube plate power supply source, means for establishing biasing potentials at the grid terminals of the aforesaid third and fourth vacuum tubes, a previously-mentioned electromagnetic type of indicating meter, the said meter being designated hereinafter as a surge meter, the winding of the said surge meter being connected in series with the anode and cathode elements of a previously mentioned fifth vacuum tube operating as a rectifier, the said surge meter and vacuum tube rectifier being connected between the terminals of the plate elements of the aforesaid third and fourth vacuum tubes, means for relating the ohmic value of resistance existing between the previously described positively and negatively polarized skin-contacting electrode elements to the value of negative biasing potential appearing at the terminals of the above-mentioned first vacuum tube, means for establishing an electrical potential between the plate and cathode elements of the said first vacuum tube, the said electrical potential being applied to the said tube through the winding of a previously-mentioned second electromagnetic type of indicating meter.

3. An electropsychometer, a bioelectronic instrument that registers certain electropsychophysical conditions in the case of a person to whom it is applied, comprising five vacuum tubes or a lesser number of twin-type vacuum tubes described and considered as equivalent to five separate tubes and hereinafter designated as the first triode-type tube, the second triode-type tube, the third triode-type tube, the fourth triode-type tube, and a fifth diode or diode-connected tube, two electromagnetic indicating meters, and a system of skin-contacting electrode elements, means for establishing an electrical potential between the said electrode elements, means for connecting the positively polarized element or elements of the said skin-contacting electrode system to one terminal of a capacitor, the other terminal of the said capacitor being connected to the grid terminal of the above-mentioned second vacuum tube, the grid terminal of the said vacuum tube also being connected to one terminal of a resistance, the other terminal of the said resistance being connected to the cathode terminal of the aforesaid second vacuum tube, the said cathode terminal of the second tube being also connected to the negatively polarized element or elements of the aforesaid skin-contacting electrode system, a conductor from the cathode terminal of the said second vacuum tube to the grid terminal of a previously mentioned third vacuum tube, a conductor from the cathode terminal of the said third vacuum tube to the cathode terminal of a previously mentioned fourth vacuum tube, means for establishing an electrical potential between the plate and cathode elements of the said third and fourth vacuum tubes, the said electrical potential being derived from a common vacuum tube plate power supply source, means for connecting the plate terminal of the aforesaid second vacuum tube to the said vacuum tube plate power supply source, means for establishing biasing potentials at the grid terminals of the aforesaid third and fourth vacuum tubes, a previously-mentioned electromagnetic type of indicating meter, the said meter being designated hereinafter as a surge meter, the winding of the said surge meter being connected in series with the anode and cathode elements of a previously mentioned fifth vacuum tube operating as a rectifier, the said surge meter and vacuum tube rectifier being connected between the terminals of the plate elements of the aforesaid third and fourth vacuum tubes, means for relating the ohmic value of resistance existing between the previously described positively and negatively polarized skin-contacting electrode elements to the value of negative biasing potential appearing at the terminals of the above-mentioned first vacuum tube, means for establishing an electrical potential between the plate and cathode elements of the said first vacuum tube, the said electrical potential being applied to the said tube through the winding of a previously-mentioned second electromagnetic type of indicating meter, the said meter having a scale or system of scales calibrated to indicate the electrical ohmic values, or multiples or fractions thereof, existing across the above-mentioned system of skin-contacting electrode elements.

4. An electropsychometer, a bioelectronic instrument that registers certain electropsychophysical conditions in the case of a person to whom it is applied, comprising four vacuum tubes or a lesser number of twin-type tubes described and considered as equivalent to four separate tubes and hereinafter designated as the first triode-type tube, the second triode-type tube, the third triode-type tube, and the fourth triode-type tube, two electromagnetic indicating meters, and a system of skin-contacting electrode elements, means for establishing an electrical potential between the said electrode elements, means for connecting the positively polarized element or elements of the said skin-contacting electrode system to one terminal of a capacitor, the other terminal of the said capacitor being connected to the grid terminal of the above-mentioned second vacuum tube, the grid terminal of the said vacuum tube also being connected to one terminal of a resistance, the other terminal of the said resistance being connected to the cathode terminal of the aforesaid second vacuum tube, the said cathode terminal of the said second tube being also connected to the negatively polarized element or elements of the aforesaid skin-contacting electrode system, a conductor from the cathode terminal of the said second vacuum tube to the grid terminal of a previously mentioned third vacuum tube, a conductor from the cathode terminal of the said third vacuum tube to the cathode terminal of a previously mentioned fourth vacuum tube, means for establishing an electrical potential between the plate and cathode elements of the said third and fourth vacuum tubes, the said electrical potential being derived from a common vacuum tube plate power supply source, means for connecting the plate terminal of the aforesaid second vacuum tube to the said vacuum tube plate power supply source, means for establishing biasing potentials at the grid terminals of the aforesaid third and fourth vacuum tubes, a previously-mentioned electromagnetic type of indicating meter, the said meter being designated hereinafter as a surge meter, the winding of the said surge meter being connected in series with a crystal type of rectifying element, the said surge meter and rectifying element being connected between the terminals of the plate elements of the aforesaid third and fourth vacuum tubes, means for relating the ohmic value of resistance existing between the previously described positively and negatively polarized skin-contacting electrode elements to the value of negative biasing potential appearing at the terminals of the above-mentioned first vacuum tube, the said electrical potential being applied to the said tube through the winding of a previously-mentioned second electromagnetic type of indicating meter.

References Cited in the file of this patent

UNITED STATES PATENTS

| | | |
|---|---|---|
| 2,308,933 | Raesler | Jan. 19, 1943 |
| 2,657,683 | Koller | Nov. 3, 1953 |